(12) United States Patent
Yamashita

(10) Patent No.: US 8,749,678 B2
(45) Date of Patent: Jun. 10, 2014

(54) SOLID-STATE IMAGING APPARATUS

(71) Applicant: Canon Kabushiki Kaisha, Tokyo (JP)

(72) Inventor: Yuichiro Yamashita, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/838,842

(22) Filed: Mar. 15, 2013

(65) Prior Publication Data

US 2013/0208156 A1 Aug. 15, 2013

Related U.S. Application Data

(63) Continuation of application No. 12/943,355, filed on Nov. 10, 2010.

(30) Foreign Application Priority Data

Dec. 2, 2009 (JP) .................................. 2009-274603

(51) Int. Cl.
*H04N 5/335* (2011.01)
*H04N 9/64* (2006.01)
*H01L 29/66* (2006.01)

(52) U.S. Cl.
USPC ............................ 348/296; 348/243; 257/239

(58) Field of Classification Search
USPC .................... 348/241, 243, 302, 308; 257/239
See application file for complete search history.

(56) References Cited

U.S. PATENT DOCUMENTS

| | | | |
|---|---|---|---|
| 6,091,793 A * | 7/2000 | Kamashita ....................... 377/60 |
| 6,501,506 B1 | 12/2002 | Miura ............................ 348/308 |
| 6,750,437 B2 | 6/2004 | Yamashita et al. .......... 250/208.1 |
| 7,271,835 B2 * | 9/2007 | Iizuka et al. ................... 348/314 |
| 7,378,694 B2 * | 5/2008 | Yi et al. ......................... 257/291 |
| 7,456,882 B1 | 11/2008 | Hiyama et al. ................ 348/294 |
| 8,085,321 B2 * | 12/2011 | Xu et al. ........................ 348/241 |
| 2005/0040485 A1 | 2/2005 | Kawahito ...................... 257/414 |
| 2009/0096901 A1 * | 4/2009 | Bae et al. ....................... 348/294 |
| 2009/0219418 A1 * | 9/2009 | Fujita ............................ 348/243 |
| 2010/0045805 A1 * | 2/2010 | Panicacci ................... 348/208.1 |

FOREIGN PATENT DOCUMENTS

| JP | H 10-322599 | 12/1998 |
| JP | 11-177076 | 7/1999 |
| JP | 2005-065074 | 3/2005 |

* cited by examiner

*Primary Examiner* — Trung Diep
(74) *Attorney, Agent, or Firm* — Fitzpatrick, Cella, Harper & Scinto

(57) ABSTRACT

A solid-state imaging apparatus which performs a global exposure operation, in a determined imaging region, for performing exposure as matching respective start times and respective end times of all rows, comprises: plural unit pixels arranged in two-dimensional matrix and each comprising a photoelectric converting unit for generating a pixel signal by photoelectric conversion, a holding unit for holding the generated pixel signal, and a first gate for transferring the generated pixel signal to the holding unit; a first controlling line connected commonly to the first gates in the unit pixels on the same row; a vertical controlling circuit for resetting the unit pixel; and a first driving line connected to the first controlling line, and not connected to and thus independent of the vertical controlling circuit, thereby enabling to reduce a current flowing in a power supply of the vertical controlling circuit when driving electrodes of the holding units.

14 Claims, 10 Drawing Sheets

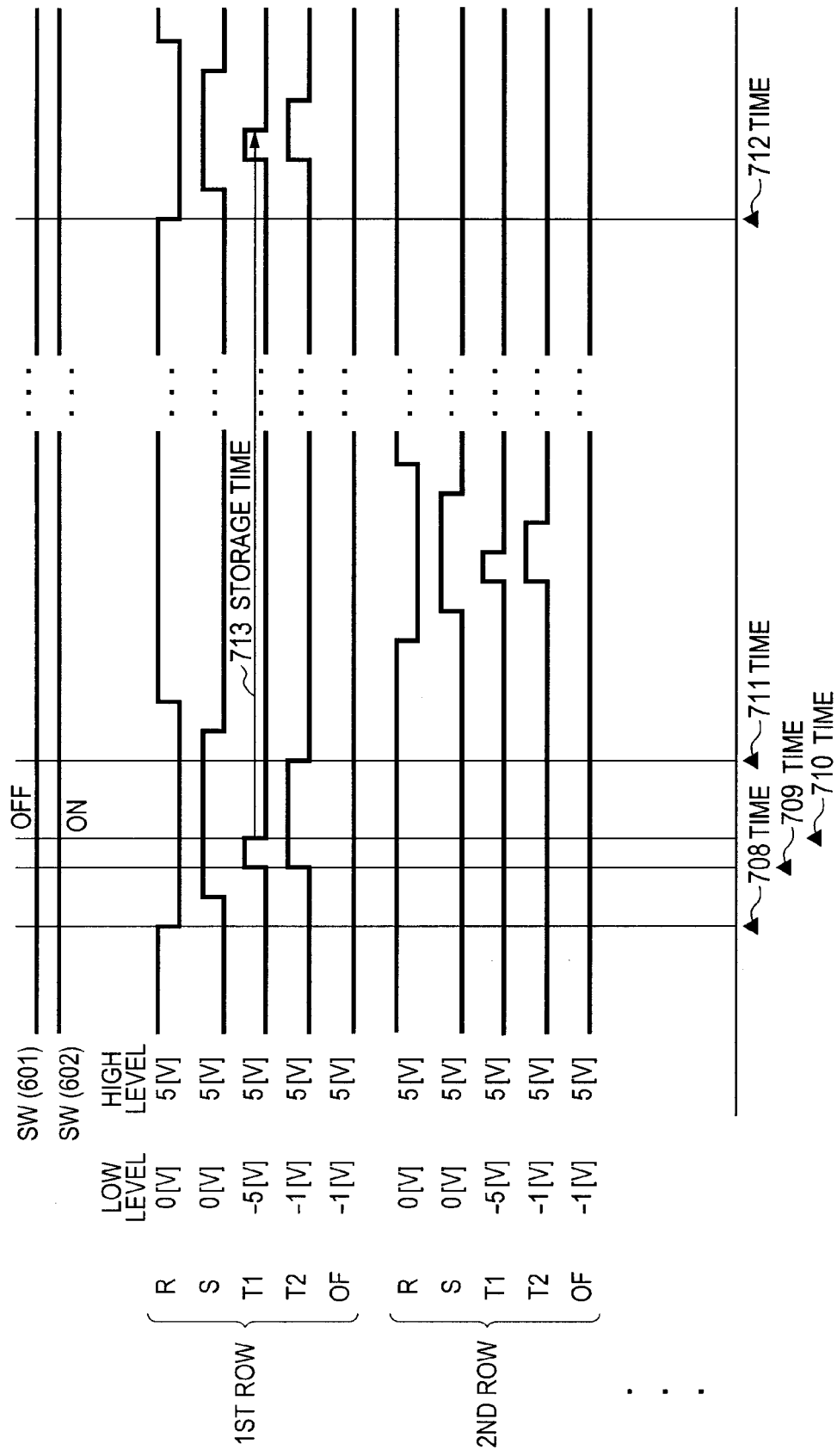

SOLID-STATE IMAGING APPARATUS

This application is a continuation of U.S. patent application Ser. No. 12/943,355, filed Nov. 10, 2010 (currently pending), which is incorporated by reference herein in its entirety, as if fully set forth herein, and claims the benefit of priority under 35 U.S.C. §119, based on Japanese Priority Application No. 2009-274603, filed Dec. 2, 2009, which is incorporated by reference herein in its entirety, as if fully set forth herein.

BACKGROUND OF THE INVENTION

1. Field of the Invention

The present invention relates to a solid-state imaging apparatus.

2. Description of the Related Art

There is an active pixel type solid-state imaging apparatus such as a CMOS (Complementary Metal-Oxide Semiconductor) image sensor. In the solid-state imaging apparatus like this, exposure control by electronic shutter is performed by using a method which is generally called line exposure to be performing by driving a pixel matrix for each row, or rolling shutter. In this method, an exposure start time for each row is different from exposure start times for other rows, and also an exposure end time for each row is different from exposure end times for other rows. On the other hand, there has been proposed a method of achieving a global electronic shutter function in which, when exposure is performed, exposure start times for all rows are matched with others and also exposure end times for all the rows are matched with others. Here, in case of achieving the global electronic shutter function, it is necessary to simultaneously drive all pixels to control the start of the exposure and the end of the exposure. In this case, as disclosed in Japanese Patent Application Laid-Open H11-177076, a vertical controlling circuit to be used for the line exposure is exchanged for a vertical controlling circuit to be used for global electronic shutter to achieve the above simultaneous driving for all the rows.

Incidentally, in the active pixel type solid-state imaging apparatus which adopts the global electronic shutter, it is necessary to provide a holding unit for holding electrons generated in photoelectric conversion by a photodiode before these electrons are read as voltage signals to the outside of the pixel. In this regard, it is necessary to simultaneously drive the holding units respectively provided in the numerous pixels exceeding 10,000,000. However, in the related background art, a problem which is peculiar to a driving circuit of the holding unit has not been discussed up to now. More particularly, it has not been discussed what kind of vertical controlling circuit should be used to simultaneously drive the numerous holding units.

An object of the present invention is to provide the solid-state imaging apparatus which can reduce, in case of driving electrodes of the holding units, a current flowing in the vertical controlling circuit.

SUMMARY OF THE INVENTION

A solid-state imaging apparatus according to the present invention is a solid-state imaging apparatus which performs a global exposure operation, in a determined imaging region, for performing exposure as matching respective start times of all rows with others and respective end times of all the rows with others, and is characterized by comprising: plural unit pixels which are arranged in two-dimensional matrix, the unit pixel further comprising a photoelectric converting unit which is configured to generate a pixel signal by photoelectric conversion, a holding unit which is configured to hold the pixel signal generated by the photoelectric converting unit, and a holding unit gate electrode which is configured to transfer the pixel signal generated by the photoelectric converting unit to the holding unit; a first controlling line which is connected commonly to the holding unit gate electrodes in the unit pixels on the same row; a vertical controlling circuit which is configured to reset the unit pixel; and a first driving line which is connected to the first controlling line, and which is not connected to and is independent of the vertical controlling circuit.

Further features and aspects of the present invention will become apparent from the following detailed description of exemplary embodiments with reference to the attached drawings.

BRIEF DESCRIPTION OF THE DRAWINGS

FIGS. 7A and 7B are timing charts for describing driving timings of circuits illustrated in FIGS. 6A and 6B.

DESCRIPTION OF THE EMBODIMENTS

Preferred embodiments of the present invention will now be described in detail in accordance with the accompanying drawings.

First Embodiment

Figure 1A:
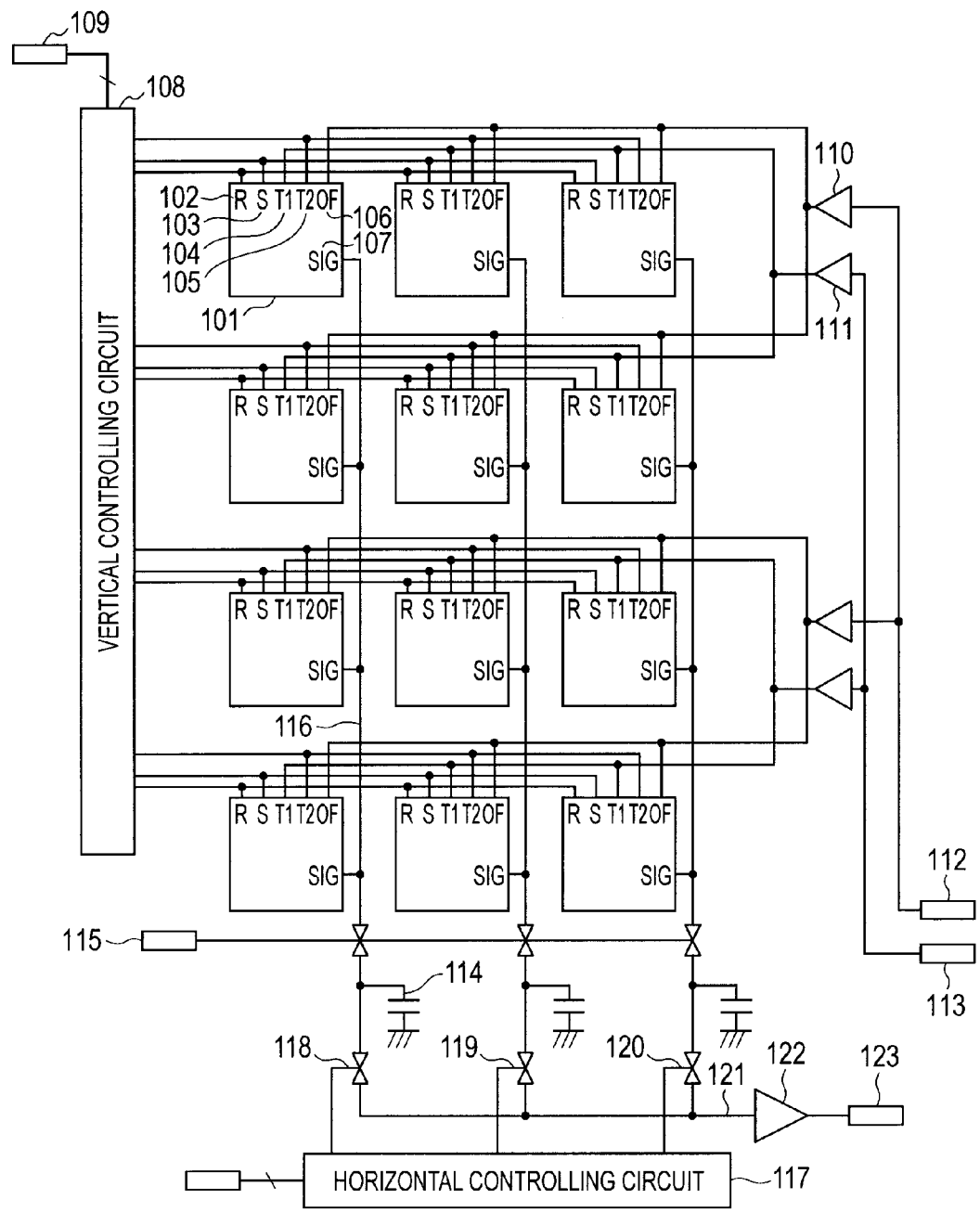
FIGS. 1A and 1B are constitutional diagrams respectively illustrating a solid-state imaging apparatus and a unit pixel according to a first embodiment of the present invention.

FIG. 1A is an overall circuit diagram illustrating a solid-state imaging apparatus according to the first embodiment of the present invention. In the present embodiment, the solid-state imaging apparatus, which is an active pixel type solid-state imaging apparatus such as a CMOS image sensor, performs a global exposure operation (i.e., a global electronic shutter operation) for carrying out exposure as matching respective exposure start times of all rows with others and respective exposure end times of all the rows with others. Each of plural unit pixels 101 includes an R terminal 102 for managing to reset the pixel, an S terminal 103 for managing to select the pixel, a T1 terminal 104, a T2 terminal 105, an OF terminal 106 for managing to discharge electric charges from a photodiode, and an SIG terminal 107 for managing to output pixel signals. Further, the plural unit pixels 101 are arranged in two-dimensional matrix. More specifically, the T1 terminal 104 is the terminal for managing to transfer the charge from the photodiode to a holding capacitance in the pixel, and the T2 terminal 105 is a terminal for managing to transfer the charge from the holding capacitance in the pixel to a floating diffusion. A vertical controlling circuit 108 is constituted by a vertical scanning circuit for designating selection order of the rows, and a vertical driving circuit for driving the rows. The vertical controlling circuit 108 performs resetting of the unit pixel 101, and the like. Here, various kinds of vertical scanning circuits such as a shift register, a decoder and the like can be used in the vertical controlling circuit 108. Incidentally, the vertical controlling circuit 108 is connected to the R terminals 102, the S terminals 103 and the T2 terminals 105 of all the unit pixels 101. A vertical controlling signal is supplied from a vertical controlling signal circuit 109 to control the vertical driving circuit 108, a buffer 111 drives the T1 terminal 104 of each unit pixel, and a buffer 110 drives the OF terminal 106 of each unit pixel. Further, a first controlling line is connected commonly to the T1 terminals 104 of the unit pixels 101 on the same row. The buffer 111 (acting as a first driving circuit), which is independent of the vertical controlling circuit 108, drives the first controlling line through a first driving line. Here, the first driving line is connected to the first controlling line. Furthermore, a second controlling line is connected commonly to the OF terminals 106 of the unit pixels 101 on the same row. The buffer 110 (acting as a second driving circuit), which is independent of the vertical controlling circuit 108, drives the second controlling line through a second driving line. Here, the second driving line is connected to the second controlling line. Each of the first controlling line and the second controlling line is not connected to the vertical controlling circuit 108, and is thus independent of the vertical controlling circuit 108. As described later, a low-level signal which is different from ground potential of the vertical controlling circuit 108 has to be supplied to the T1 terminal 104. For this reason, the buffer has a level shift function. An external input terminal 112 is connected to the buffer 110, and an external input terminal 113 is connected to the buffer 111. Here, a signal which has a logic level determined based on an input/output specification between the solid-state imaging apparatus and an external apparatus is input to each of the external input terminals 112 and 113, and there is a possibility that each terminal includes a necessary I/O circuit such as a Schmitt trigger circuit, a buffer or the like. A line memory 114, which is provided for each column, is used to control "ON/OFF" operations of connection to a column signal line 116 at a terminal 115. A horizontal controlling circuit 117 controls terminals 118, 119 and 120 in determined order, and thus determines connection between the line memories 114 and a horizontal signal line 121. Further, the solid-state imaging apparatus includes an external output amplifier 122, and an external signal output terminal 123.

Figure 1B:
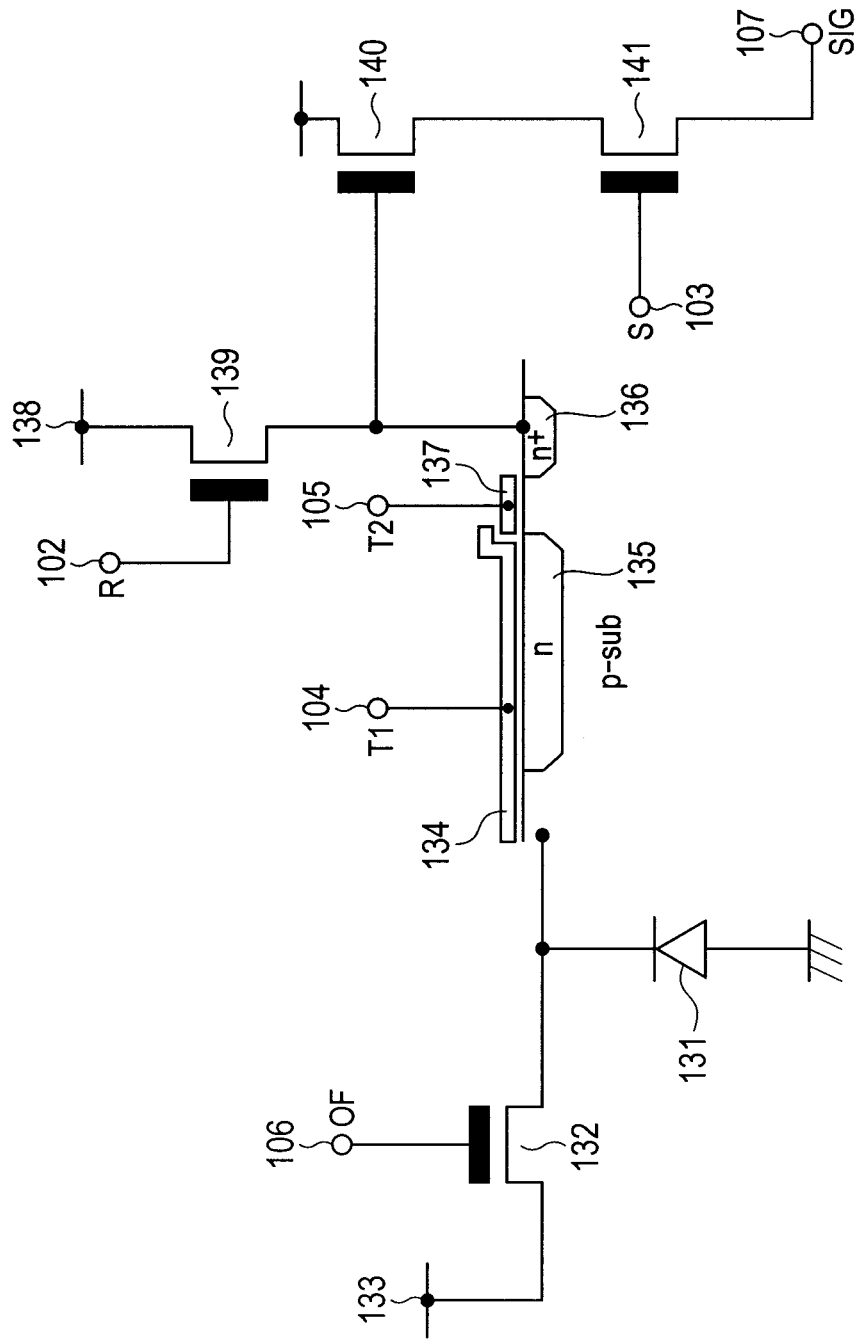

FIG. 1B is a detailed circuit diagram of the unit pixel 101 illustrated in FIG. 1A. In this drawing, portions which are difficult to be illustrated as circuit parts are partially indicated as the cross sections of the device structures. In any case, a photodiode 131 (acting as a photoelectric converting unit) generates the pixel signal by photoelectric conversion. The photodiode 131 is connected to an overflow drain 133 through an overflow drain transistor 132 which is controlled by the OF terminal 106. The overflow drain transistor 132 is connected between the photodiode 131 and the overflow drain 133. The OF terminal 106 is connected to the gate electrode of the overflow drain transistor 132. The overflow drain 133 functions to discharge electric charges excessively generated by the photodiode 131, to the power supply. A T1 gate electrode 134 (acting as a holding unit gate electrode), which is controlled by the T1 terminal 104, connects the photodiode 131 and a holding unit 135 to each other. The T1 gate electrode 134 also functions to suppress generation of a dark current by performing pinning of the surface of a semiconductor substrate by biasing the surface of the holding unit to a strong negative voltage during a storage time (or a storage period).

The holding unit 135 holds the pixel signals generated by the photodiode 131. The T1 gate electrode 134 is the electrode which is used to transfer the pixel signal generated by the photodiode 131 to the holding unit 135. A floating diffusion 136 holds the pixel signals. A T2 gate electrode 137 (acting as a floating diffusion gate electrode), which is connected to the T2 terminal 105, is the electrode which is used to transfer the pixel signal held by the holding unit 135 to the floating diffusion 136. The holding unit 135 and the floating diffusion 136 are mutually connected to each other by means of the T2 gate electrode 137 which is controlled by the T2 terminal 105. A reset transistor 139 is connected between the floating diffusion 136 and a reset power supply 138 (acting as a reset potential node). The R terminal 102 is connected to the gate electrode of the reset transistor 139. The floating diffusion 136 and the reset power supply 138 are controlled by the reset transistor 139 which is controlled by the R terminal 102. The gate electrode of a source follower transistor 140 is connected to the floating diffusion 136. The drain electrode of a selection transistor 141 is connected to the source electrode of the source follower transistor 140, and the source electrode of the selection transistor 141 is connected to the output terminal (SIG terminal) 107. The S terminal 103 is connected to the gate electrode of the selection transistor 141. The source follower transistor 140 of the pixel is connected to the SIG terminal 107 through the selection transistor 141 which is controlled by the S terminal 103, and the source follower transistor 140 outputs, together with a resistance load or a current source provided for each column, a voltage signal of the floating diffusion 136 to the column signal line 116. Here, the overflow drain 133 is provided through a switch. However, the overflow drain 133 may be formed by utilizing a potential barrier provided in the depth direction of the semiconductor substrate, as known by a CCD (charge coupled device).

The circuit which achieves the global exposure operation is characterized in that electrostatic capacitance which parasites at the terminal connected to the T1 gate electrode 134 is highly large because the area (square measure) of the holding unit 135 is large. Namely, the holding unit 135 has the large area because it is necessary to hold the number of charges equal to or larger than a saturation charge amount, and the capacitance of the holding unit 135 may likely increase by ten times as compared with the input capacitance of another terminal. The present embodiment is characterized by making the T1 terminal 104, which drives the large electrostatic capacitance, independent of the vertical controlling circuit 108. The buffer 111 which is driven by a power supply different from that for driving the vertical controlling circuit 108 is provided in regard to the T1 terminal 104, thereby strengthening the driving force of the driving line. Incidentally, in the present embodiment, also the OF terminal 106, which is used to control the overflow drain 133, is independent of the vertical controlling circuit 108. Such a constitution is not essential to bring about an effect of the present embodiment. However, as described later, since it is necessary to simultaneously drive the OF terminals 106 on all the rows in case of performing the global exposure operation, a large current flows in the OF terminal 106. For this reason, it is more suitable to provide the driving line which is independent of the vertical controlling circuit 108. As well as the T1 terminal 104, the buffer 110 which is driven by a power supply different from that for driving the vertical controlling circuit 108 is provided to the OF terminal 106, thereby strengthening the driving force of the driving line.

Figure 2:
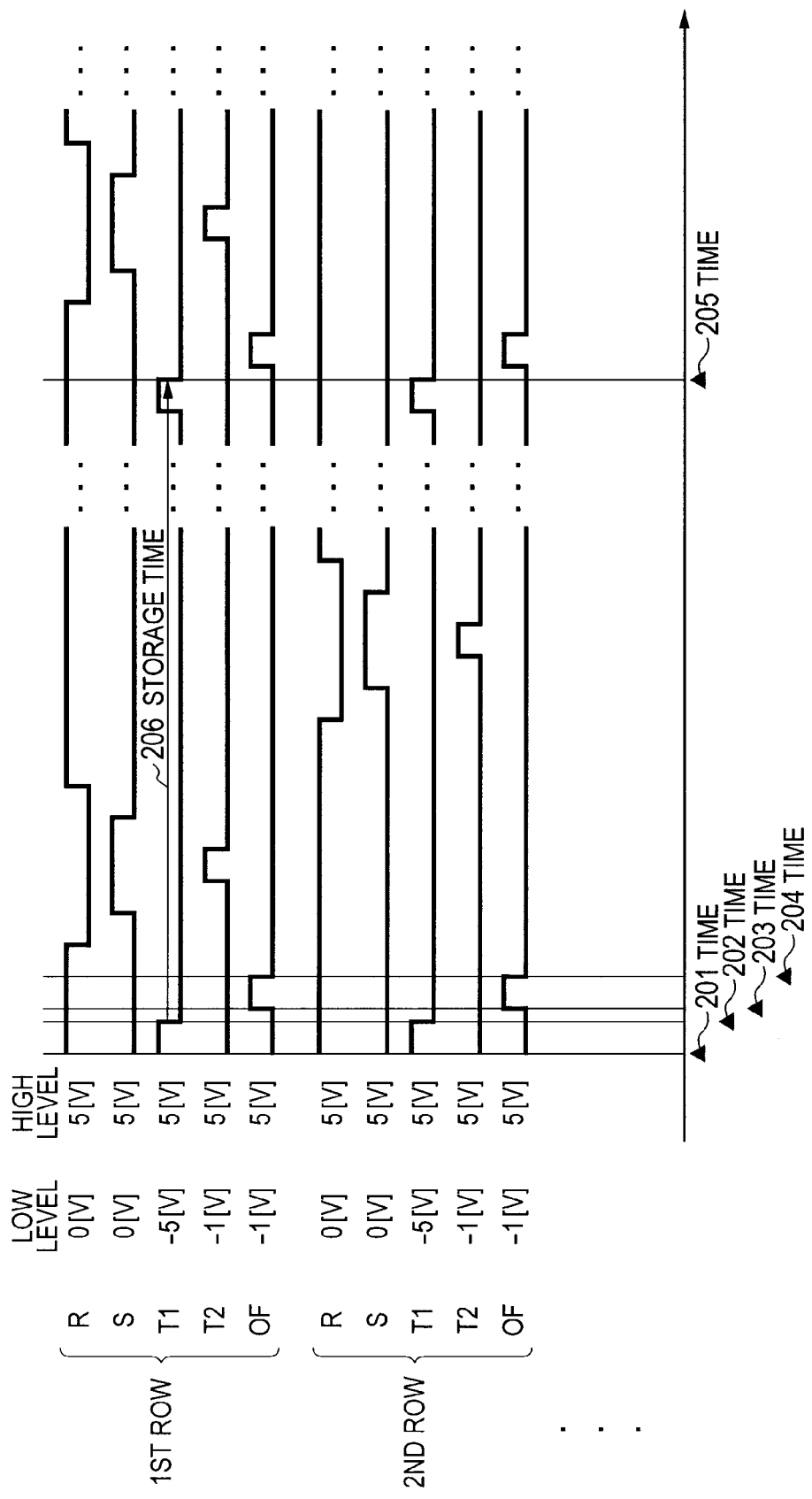
FIG. 2 is a timing chart for describing driving timings of circuits illustrated in FIGS. 1A and 1B.

FIG. 2 is a timing chart for describing driving timings of the circuits illustrated in FIGS. 1A and 1B. In this drawing, the waveforms of pulses to be applied to the R, S, T1, T2 and OF terminals of the respective rows are indicated with their respective low-level and high-level potentials. More specifically, at a time 201, the T1 terminals of all the rows are simultaneously turned "ON", whereby, in each unit pixel, an optical signal which is generated by the photodiode 131 is transferred to the holding unit 135. Then, at a time 202, the T1 terminals are turned "OFF", and the transfer operation ends. A period from the time 202 to a time 205 when the T1 terminals are next turned "OFF" is set as a storage time 206. Subsequently, to initialize the photodiode 131 in each unit pixel, connection of the overflow drain 133 is made "ON" at a time 203 under the control of the OF terminal, and then the connection is made "OFF" at a time 204 under the control of the OF terminal. The signals transferred to the holding units 135 are read by driving the respective R, S and T2 terminals for each row. Such an operation is the same as that in the related background art, whereby the explanation thereof will be omitted. Also, the pulse reading operations of the line memory, the horizontal driving circuit and the like are the same as those in the related background art, whereby the explanation thereof will be omitted. Characteristically, the T1 terminals 104 and the OF terminals 106 which are driven simultaneously for all the pixels are driven respectively by the wirings and the buffers 111 and 110 which are independent of the vertical controlling circuit 108, and other terminals such as the R, S and T2 terminals are driven for each row by the vertical controlling circuit 108.

Figure 3:
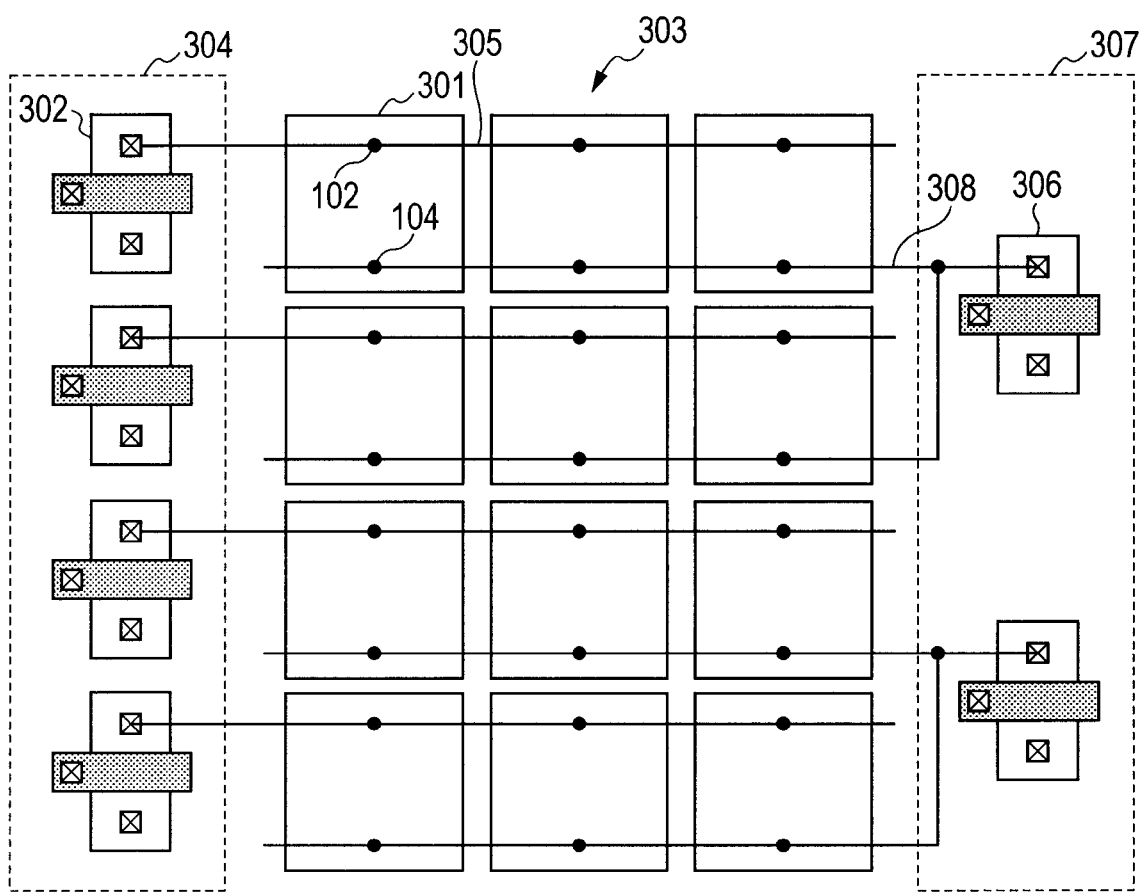
FIG. 3 is a plan view illustrating layout of a part of the solid-state imaging apparatus illustrated in FIGS. 1A and 1B.

FIG. 3 is a plan view illustrating layout of the vertical controlling circuit 108 and a part of the group of the unit pixels 101 respectively illustrated in FIG. 1A. In this drawing, a unit pixel 301 is equivalent to the unit pixel 101 illustrated in FIGS. 1A and 1B. A part of the final-stage circuit which constitutes the vertical controlling circuit 108 is exemplarily indicated as an NMOS (Negative channel Metal Oxide Semiconductor) 302 which is provided in a P-well 304 in an N-type semiconductor substrate 303. Although another NMOS, a PMOS (Positive channel Metal Oxide Semiconductor) and the like are of course provided as the constituent elements, these elements are not used for explaining the principle of the present embodiment, whereby the description of these elements will be omitted. An output 305 from the NMOS 302 is connected to the R terminals 102 which are driven for each row. Here, connection states of the output to the S and T2 terminals are not illustrated in this drawing. However, the constitutions of wells and transistors of these terminals can be easily analogized from the above-described constitution although respective circuits are different. On the other hand, a part of the circuit which constitutes each of the buffers 111 and 110 to be used for the pulses input respectively to the T1 terminal 104 and the OF terminal 106 which are driven in a lump with respect to all the pixels is exemplarily indicated as an NMOS 306 which is provided in a P-well 307. For example, an output 308 is connected to the T1 terminals of the two rows, such as the T1 terminal 104 of the unit pixel 301 and the like.

Subsequently, the effect of the present embodiment will be described. That is, in the present embodiment, in the global electronic shutter constitution which performs the global exposure operation, since a capacitance of each pixel at the T1 gate electrode 134 which is connected to the holding unit 135 is large as compared with those at other terminals, it is characterized in that a load capacitance for each row is extremely large. For example, in a case where the storage time is controlled in a short time such as 1/16,000 seconds, it is necessary to drive the T1 terminal 104 at high speed. Here, if all the pixels are simultaneously driven at high speed by using the vertical controlling circuit 108 according to the related background art, the NMOS transistors corresponding to all the rows in the vertical controlling circuit 108 simultaneously start discharging. For this reason, the potential of the P-well changes greatly due to the parasitic capacitance between the NMOS transistors for all the pixels and the P-well in which these transistors exist. Further, since there is large parasitic resistance on the power supply line as described later, there is a risk that a latch-up phenomenon occurs in the vertical controlling circuit 108 due to the change of the P-well. As described above, it is necessary to set the low level of the T1 terminal 104 strongly on the side of negative potential to suppress the generation of the dark current by performing pinning of the silicon surface of the holding unit 135. For this reason, it is necessary to connect the potential of the P-well, in which the NMOS transistor for driving the T1 terminal 104 is arranged, not to the ground potential to be used by the vertical controlling circuit 104 but to another power supply which is independent of the ground potential and of which the level is −3V or so. To lay out the independent power supply line, a wiring which is divided from the layout of the ground potential is necessary. For this reason, wiring resistance tends to easily increase, whereby the latch-up phenomenon easily occurs.

Figure 4:
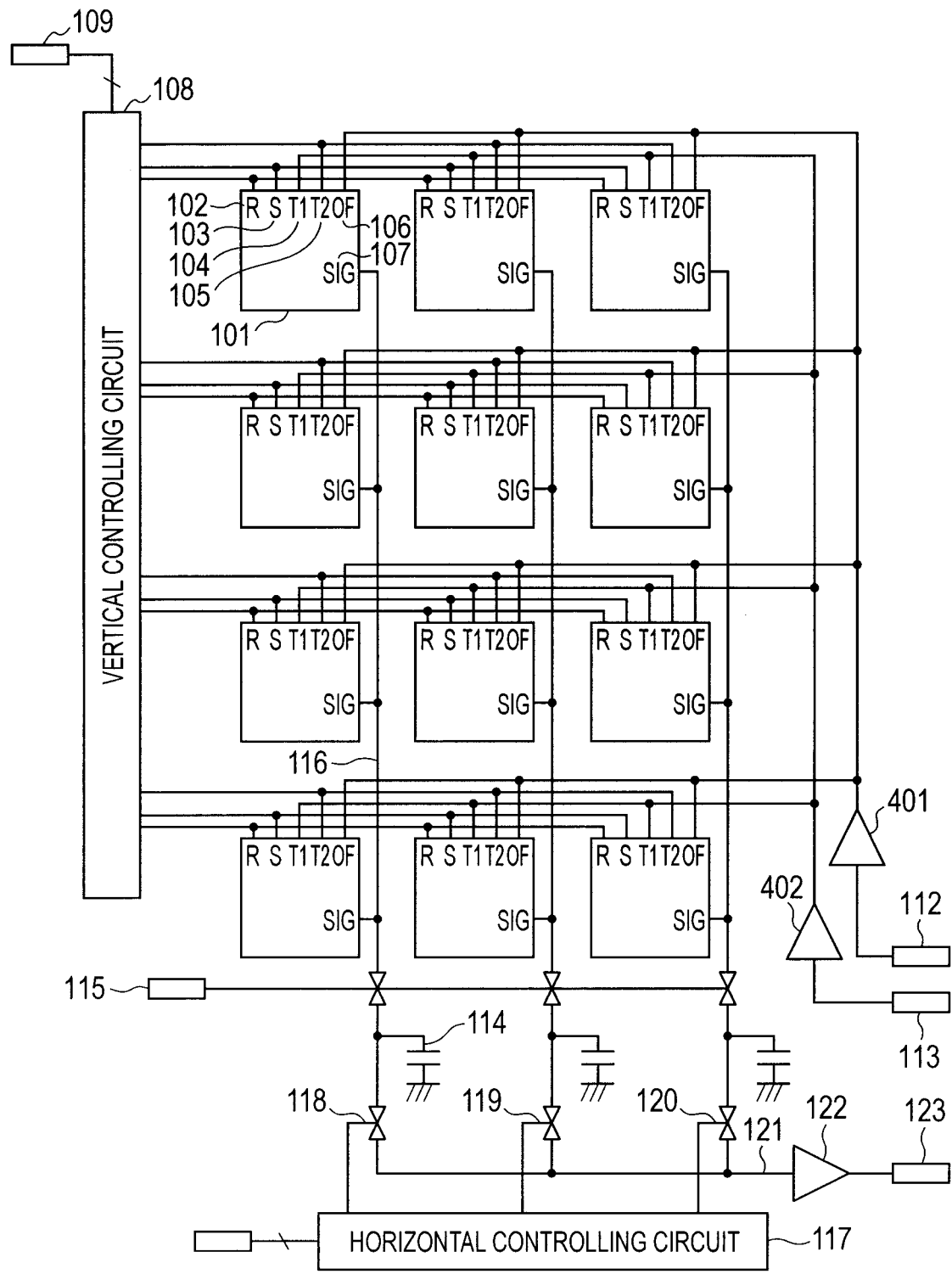
FIG. 4 is another overall constitutional diagram of the solid-state imaging apparatus according to the first embodiment of the present invention.

In the present embodiment, the global exposure pulses, at the T1 terminals 104 and the OF terminals 106 which are driven with respect to the overall surface, are given respectively from the dedicated driving circuits (buffers) 111 and 110 which are different from the pulses driven for each row. Therefore, it is said that at least the first controlling lines for two or more rows are directly connected. For this reason, it is possible to optimize the driving circuit. As a result, it is possible to limit that an excessive current flows, and it is also possible to suppress that the power supply potential and the ground potential change, whereby it is thus possible to have the effect that the latch-up phenomenon does not occur easily. Incidentally, in the circuit diagram of the present embodiment, the controlling lines corresponding to the two rows are tied up and then connected to the driving circuit. It should be noted that such a constitution is one example. Namely, the number of the controlling lines to be tied up is not limited. For example, as illustrated in FIG. 4, the lines to be used to drive the T1 terminals 104 and the OF terminals 106 may be tied up in a lump for all the rows, and then consolidated into buffers 402 and 401 respectively. In this case, the output terminal of the buffer 402 is connected commonly to the T1 terminals 104 of all the unit pixels 101 through the first controlling line. Moreover, the output terminal of the buffer 401 is connected commonly to the OF terminals 106 of all the unit pixels 101 through the second controlling line.

Second Embodiment

Figure 5:
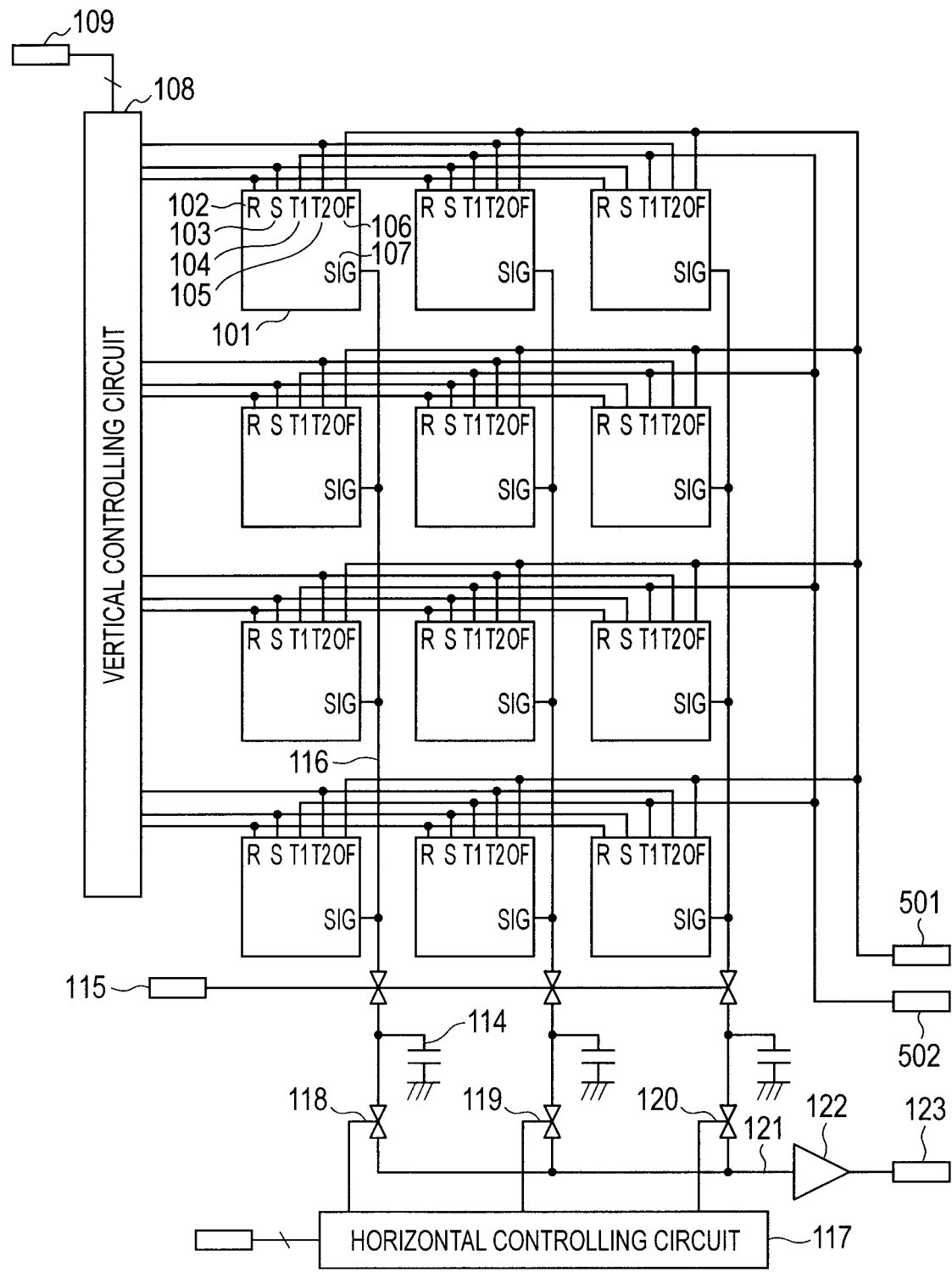
FIG. 5 is an overall constitutional diagram of a solid-state imaging apparatus according to a second embodiment of the present invention.

FIG. 5 is an overall constitutional diagram of a solid-state imaging apparatus according to the second embodiment of the present invention. In this drawing, the constituent elements same as those illustrated in FIG. 1A are added with the same corresponding reference numerals and symbols. The present embodiment is characterized in that the controlling lines of T1 terminals 104 and OF terminals 106 which are used to simultaneously drive all pixels are respectively tied up for all rows, and these lines are directly connected to external input terminals 502 and 501 respectively. Here, each of the external input terminals 501 and 502 is constituted to directly transmit an external signal. It is necessary to apply a controlling signal which does not have a logic level but has high and low levels that a holding unit requires, to each of the external input terminals 501 and 502. Such a constitution can be achieved in a case where an external pulse generating circuit connected to each of the external input terminals 501 and 502 has a sufficient driving capability. In the constitution according to the second embodiment, since it is unnecessary to arrange a buffer circuit in the solid-stage imaging apparatus, it is possible to have an additional effect that a latch-up phenomenon due to the circuit for driving the holding unit does not occur in principle.

Third Embodiment

Figure 6A:
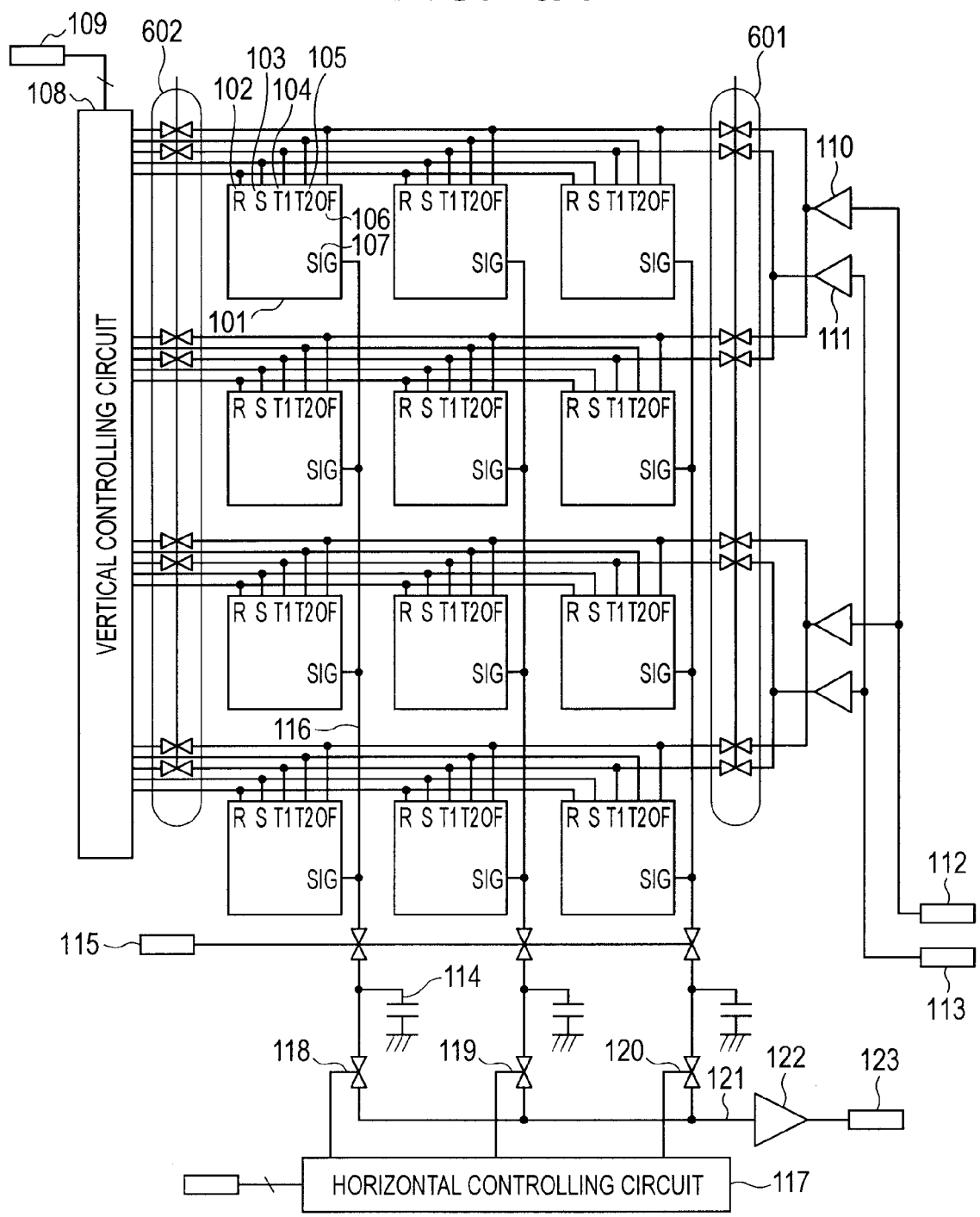
FIGS. 6A and 6B are constitutional diagrams respectively illustrating a solid-state imaging apparatus and a unit pixel according to a third embodiment of the present invention.

FIG. 6A is an overall constitutional diagram of a solid-state imaging apparatus according to the third embodiment of the present invention. In this drawing, the constituent elements same as those illustrated in FIG. 1A are added with the same corresponding reference numerals and symbols. Hereinafter, a point of the present embodiment which is different from the first and second embodiments will be described. The output terminal of a buffer 111 is connected to T1 terminals 104 of unit pixels 101 through a switch 601, and the output terminal of a buffer 110 is connected to OF terminals 106 of the unit pixels 101 through the switch 601. Further, the output terminals of a vertical controlling circuit 108 are connected to the T1 terminals 104 and the OF terminals 106 of the unit pixels 101 through a switch 602. The first switch 601 is connected between a first controlling line which is connected commonly to the T1 terminals 104 and a first driving line which is connected to the output terminal of the buffers 111. Further, the first switch 601 is connected between a second controlling line which is connected commonly to the OF terminals 106 and a second driving line which is connected to the output terminal of the buffer 110. Besides, the second switch 602 is connected between the vertical controlling circuit 108 and the first controlling line which is connected commonly to the T1 terminals 104. Further, the second switch 602 is connected between the vertical controlling circuit 108 and the second controlling line which is connected commonly to the OF terminals 106.

Figure 6B:
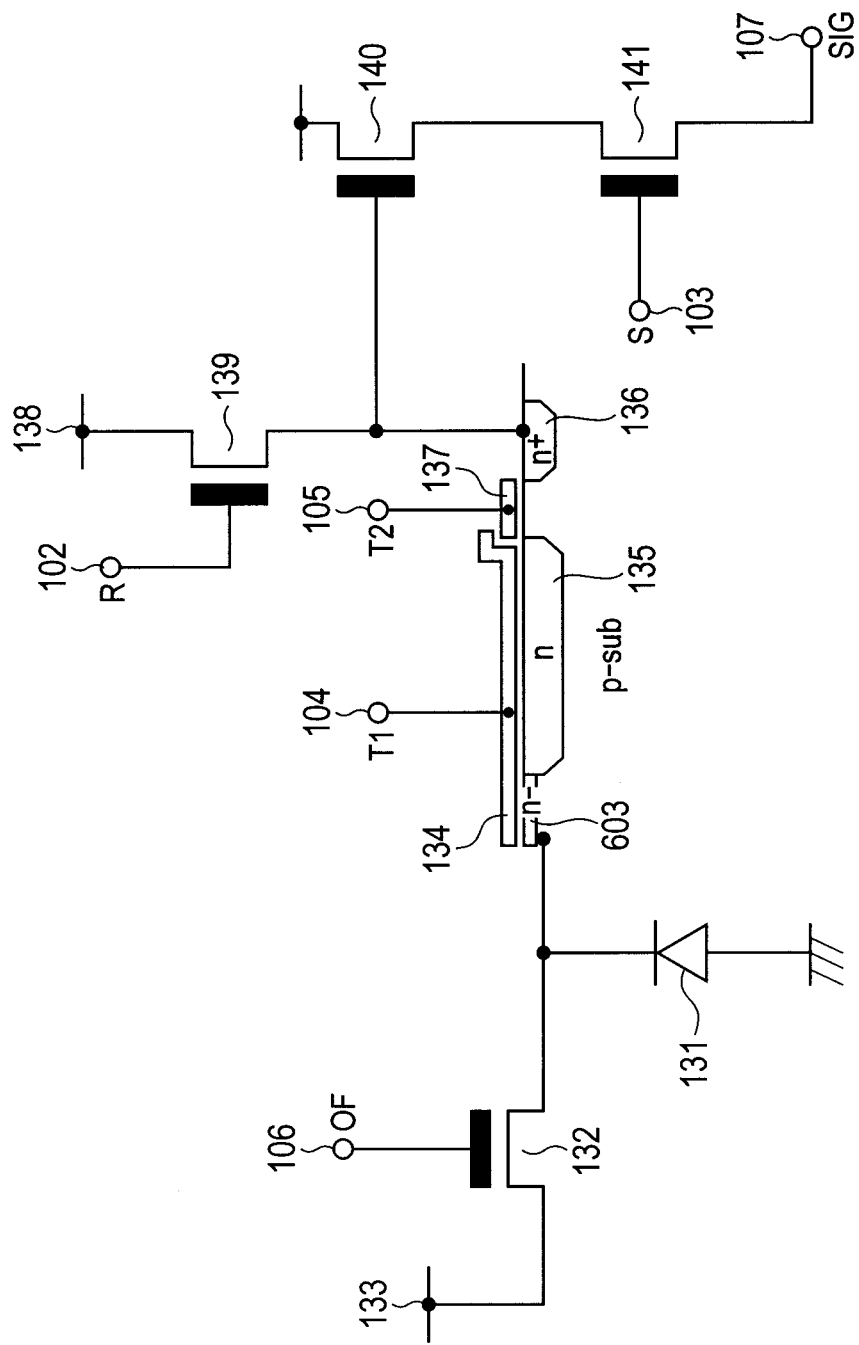

FIG. 6B is a detailed circuit diagram illustrating the circuit and the constitution of the unit pixel illustrated in FIG. 6A. In this drawing, the constituent elements same as those illustrated in FIG. 1B are added with the same corresponding reference numerals and symbols. Unlike FIG. 1B, the constitution illustrated in FIG. 6B performs an operation to hold a part of signals in a holding unit 135 during a storage time. More specifically, a transferring unit 602, which is arranged between a photodiode 131 and the holding unit 135, is provided as a buried channel. For this reason, an electric charge which is generated by the photodiode 131 is quickly transferred to the holding unit 135 through such a buried-channel portion of which the potential barrier is lowest from the viewpoint of the photodiode 131. By the above constitution, although sensitivity of the solid-stage imaging apparatus is determined on the basis of the photodiode 131, the number of saturation charges is not limited by the dimensions of the photodiode 131. Namely, the number of the saturation charges can be determined by the holding unit 135 which can store a larger number of charges.

Figure 7A:
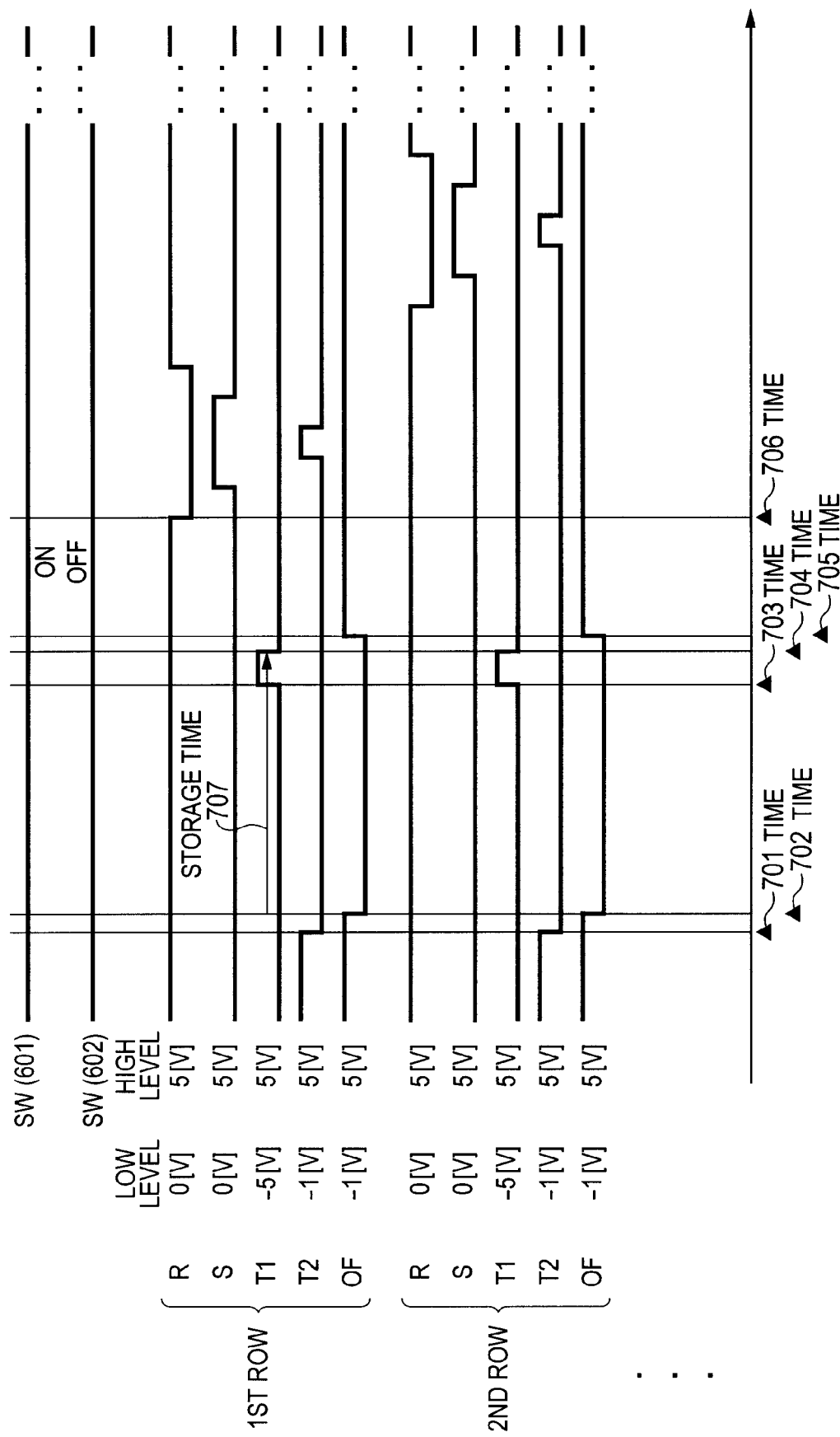

FIGS. 7A and 7B are timing charts for respectively describing driving timings of the circuits illustrated in FIGS. 6A and 6B. In the drawings, the driving timings in two kinds of driving modes, i.e., a global exposure mode and a line exposure mode, are described respectively.

FIG. 7A illustrates the driving timing in the global exposure mode. In this mode, the switch 601 is always "ON" and the switch 602 is always "OFF", a controlling signal to be used to simultaneously drive all the pixels is available, and the T1 terminals 104 and the OF terminals 106 are controlled not to be able to perform the driving for each row. At a time 701, the T2 terminal of each of all the pixels is transitioned from "ON" to "OFF", whereby resetting of the holding unit 135 is released. Next, at a time 702, the OF terminal is transitioned from "ON" to "OFF", whereby resetting of the photodiode 131 is released. Next, the T1 terminal is turned "ON" at a time 703, and the T1 terminal is turned "OFF" immediately at a time 704, whereby a storing operation ends. Such a period is set as a storage time 707. After then, the OF terminal is turned "ON" immediately at a time 705 to reset the photodiode 131 so that the changes generated by the photodiode 131 are not transferred to the holding unit 135. The reason why the T1 terminal is turned "ON" and "OFF" respectively at the times 703 and 704 is to prevent a lack of signals by exhaustively transferring the signal charges remained in the photodiode 131 to the holding unit 135 at the end of the storage time. After then, from a time 706, each row is controlled, and the charges stored in the holding unit 135 are sequentially read. Here, detailed descriptions of the controlling for each row and the reading of the charges to the horizontal signal line will be omitted. Incidentally, the T2 terminals for all the pixels are simultaneously controlled from the side of the vertical controlling circuit 108 in the present embodiment. The gate capacitance to be driven corresponds to only one MOS transistor, and the pulse at the T2 terminal is not a pulse for determining the storage time. For these reasons, the T2 terminals are controlled from the side of the vertical controlling circuit 108. Of course, the controlling same as those for the T1 terminals and the OF terminals may be performed according to need. In the global exposure mode, the first switch 601 is turned "ON" and the second switch 602 is turned "OFF" to perform a global exposure operation for performing exposure as matching respective start times of all rows with others and respective end times of all the rows with others.

FIG. 7B illustrates the driving timing in the line exposure mode. In this mode, the switch 601 is always "OFF" and the switch 602 is always "ON", a controlling signal to be used to drive each row is available, and the T1, T2 and OF terminals are controlled not to be able to simultaneously perform the driving for all the pixels. In the line exposure mode, start and end times of the storing operation are different for each row. For this reason, it is characterized in the line exposure mode that, when a moving object is imaged, an obtained image is distorted according to moving speed of the relevant object. More specifically, at a time 708, it starts to control the first row to release resetting of the pixel, whereby the corresponding row is selected. After then, the T1 terminal of this row is turned "ON" at a time 709, and the charges in the photodiode 131 are transferred to the holding unit 135. At the same time, the T2 terminal is turned "ON", and the charges are transferred from the holding unit 135 to a floating diffusion 136. After then, the T1 terminal is turned "OFF" at a time 710, and the T2 terminal is turned "OFF" at a time 711, whereby the transferring operation ends. The same operation is performed to another (next) row. Such a period from a time 712 until the transferring operation of the photodiode 131 on the same row is performed in next reading is set as a storage time 713. It is characterized in the line exposure mode that, while the reading operation of a certain row is being performed, the storing operations of other all rows are performed, whereby the period for storage can be consistent with the period for reading. Further, in the line exposure mode, the first switch 601 is turned "OFF" and the second switch 602 is turned "ON", thereby performing the line exposure operation in which the exposure start time and the exposure end time for each row are different from those of other rows.

An additional effect that the present embodiment has will be described hereinafter. Since the pixel illustrated in FIG. 6B to be used in the present embodiment is used also to the storing operation of the holding unit 135 during the storage time, it is impossible for this pixel to simultaneously perform the reading operation and the storing operation. Consequently, in case of performing a moving picture imaging operation in which the storing operations simultaneously start for all the rows and then simultaneously end for all the rows, the storing operation cannot be performed while the reading operation is being performed, whereby the moving picture imaging operation is intermittently performed resultingly. However, as indicated in the present embodiment, the controlling line is made electrically changeable, by using the switch, between the path for the global exposure operation and the path for the each-row driving. Therefore, it is possible to achieve a time-continuous imaging operation.

According to the first to third embodiments of the present invention, in the case where the T1 gate electrode 134 is driven, it is possible to reduce the current which flows in the power supply of the vertical controlling circuit 108. As a result, it is possible to reduce instability of the vertical controlling circuit 108 such as the latch-up phenomenon and the like. Further, it is unnecessary to use the complicated circuits included in the vertical controlling circuit 108. Consequently, since it is possible to drive the T1 gate electrodes 134 by a more simple circuit constitution, it is possible to achieve simplification of the circuit constitution and saving of consumed power.

While the present invention has been exemplarily described with reference to what is presently considered to be the preferred embodiments, it is to be understood that the technical scope of the present invention is not limited to the described embodiments. That is, various modifications are of course possible within the range not departing from the technical scope or the capital features of the present invention. More specifically, in the global exposure operation, the storage times for all the rows on the overall imaging surface may be matched with others or alternatively, the storage times for all the rows included in a determined imaging region of the imaging surface may be matched with others.

This application claims the benefit of Japanese Patent Application No. 2009-274603, filed Dec. 2, 2009, which is hereby incorporated by reference herein in its entirety.

What is claimed is:

1. A solid-state imaging apparatus which performs a global electronic shutter operation, comprising:
   plural unit pixels which are arranged in two-dimensional matrix, each unit pixel comprising:
   a photoelectric converting unit;
   a holding unit which holds a signal generated in the photoelectric converting unit;
   an amplifying unit;
   a first transfer gate which transfers the signal generated in the photoelectric converting unit to the holding unit; and
   a second transfer gate which transfers the signal held in the holding unit to the amplifying unit;
   the solid-state imaging apparatus further comprising:
   a driving pulse supplying unit which simultaneously supplies driving pulses to the first transfer gates of the plural unit pixels including in plural rows; and
   a vertical scanning circuit which sequentially supplies the driving pulses to the second transfer gates of the plural unit pixels included in the plural rows for each row,
   wherein a well in which a transistor constituting the driving pulse supplying unit is formed is separated from a well in which a transistor constituting an output part of the vertical scanning circuit is formed.

2. The solid-state imaging apparatus according to claim 1, wherein the driving pulse supplying unit is arranged outside a semiconductor substrate on which the plural pixel units are arranged.

3. The solid-state imaging apparatus according to claim 1, further comprising:
   a first switch which is arranged on an electrical path between an output node of the driving pulse supplying unit and the first transfer gate; and
   a second switch which is arranged on an electrical path between the vertical scanning circuit and the second transfer gate,
   wherein, in the global electronic shutter operation, the global electronic shutter operation for performing exposure as matching respective start times of all the rows with others and respective end times of all the rows with others is performed by turning on the first switch and turning off the second switch, and
   in a line exposure mode, a rolling shutter operation for performing the exposure as making the start time and the end time different from each other for each row is performed by turning off the first switch and turning on the second switch.

4. The solid-state imaging apparatus according to claim 1, wherein each unit pixel further comprises:
   an overflow drain gate which is connected between the photoelectric converting unit and an overflow drain; and
   a buffer which simultaneously supplies the driving pulses to the overflow drain gates in the unit pixels of the plural rows.

5. The solid-state imaging apparatus according to claim 1, wherein each unit pixel further comprises:
   a floating diffusion which is connected to an input node of the amplifying unit; and
   a reset transistor which supplies a reset voltage to the floating diffusion;
   wherein the vertical scanning circuit sequentially supplies the driving pulses to a gate of the reset transistor for each row.

6. The solid-state imaging apparatus according to claim 1, wherein each unit pixel further comprises a selection transistor which is configured to select the unit pixel;
   wherein the vertical scanning circuit sequentially supplies the driving pulses to a gate of the selection transistor for each row.

7. A solid-state imaging apparatus which performs a global electronic shutter operation, comprising:
   plural unit pixels which are arranged in two-dimensional matrix, each unit pixel comprising:
   a photoelectric converting unit;
   a holding unit which holds a signal generated in the photoelectric converting unit;
   an amplifying unit;
   a first transfer gate which transfers the signal generated in the photoelectric converting unit to the holding unit; and
   a second transfer gate which transfers the signal held in the holding unit to the amplifying unit;
   the solid-state imaging apparatus further comprising:
   a driving pulse supplying unit which simultaneously supplies driving pulses to the first transfer gates of the plural unit pixels included in plural rows; and a vertical scanning circuit which sequentially supplies the driving pulses to the second transfer gates of the plural unit pixels included in the plural rows, for each row, wherein the driving pulse supplying unit includes a buffer.

8. The solid-state imaging apparatus according to claim 7, wherein plural ones of the buffer are arranged, and each of the plural buffers supplies the driving pulses to the plural first transfer gates included in the mutually different plural rows.

9. The solid-state imaging apparatus according to claim 7, wherein the driving pulse supplying unit is arranged outside a semiconductor substrate on which the plural pixel units are arranged.

10. The solid-state imaging apparatus according to claim 7, further comprising:

a first switch which is arranged on an electrical path between an output node of the driving pulse supplying unit and the first transfer gate; and a second switch which is arranged on an electrical path between the vertical scanning circuit and the second transfer gate, wherein, in the global electronic shutter operation, the global electronic shutter operation for performing exposure as matching respective start times of all the rows with others and respective end times of all the rows with others is performed by turning on the first switch and turning off the second switch, and in a line exposure mode, a rolling shutter operation for performing the exposure as making the start time and the end time different from each other for each row is performed by turning off the first switch and turning on the second switch.

11. The solid-state imaging apparatus according to claim 7, wherein each unit pixel further comprises:

an overflow drain gate which is connected between the photoelectric converting unit and an overflow drain; and a buffer which simultaneously supplies the driving pulses to the overflow drain gates in the unit pixels of the plural rows.

12. The solid-state imaging apparatus according to claim 7, wherein each unit pixel further comprises:

a floating diffusion which is connected to an input node of the amplifying unit; and a reset transistor which supplies a reset voltage to the floating diffusion;

wherein the vertical scanning circuit sequentially supplies the driving pulses to a gate of the reset transistor for each row.

13. The solid-state imaging apparatus according to claim 7, wherein each unit pixel further comprises a selection transistor which is configured to select the unit pixel;

wherein the vertical scanning circuit sequentially supplies the driving pulses to a gate of the selection transistor for each row.

14. The solid-state imaging apparatus according to claim 7, wherein driving force of the buffer is larger than driving force of the vertical scanning circuit at a time when the vertical scanning circuit drives transfer electrodes of unit pixels included in the selected row.

* * * * *